United States Patent [19]

Carlson

[11] Patent Number: 5,037,921

[45] Date of Patent: Aug. 6, 1991

[54] BASE RESISTANT FLUOROELASTOMERS WITH IMPROVED PROCESSIBILITY AND CURABILITY

[75] Inventor: Dana P. Carlson, Chadds Ford, Pa.

[73] Assignee: E. I. du Pont de Nemours and Company, Wilmington, Del.

[21] Appl. No.: 488,094

[22] Filed: Mar. 1, 1990

[51] Int. Cl.$^5$ .............................................. C08F 16/24
[52] U.S. Cl. ..................................... 526/247; 526/255
[58] Field of Search ................................ 526/247, 255

[56] References Cited

U.S. PATENT DOCUMENTS

| | | | |
|---|---|---|---|
| 3,467,635 | 9/1969 | Brasen et al. | 260/80.76 |
| 3,859,259 | 1/1975 | Harrell et al. | 260/77.5 |
| 4,035,565 | 7/1977 | Apotheker et al. | 526/249 |
| 4,148,982 | 4/1979 | Morozumi et al. | 526/58 |
| 4,158,678 | 6/1979 | Tatemoto et al. | 204/159.2 |
| 4,243,770 | 1/1981 | Tatemoto et al. | 525/331 |
| 4,694,045 | 9/1987 | Moore | 525/276 |
| 4,948,853 | 8/1990 | Logothetis | 526/247 |

FOREIGN PATENT DOCUMENTS 60-19325 5/1985 Japan.

Primary Examiner—Joseph L. Schofer
Assistant Examiner—N. Sarofim
Attorney, Agent, or Firm—Donald W. Huntley

[57] ABSTRACT

Base-resistant peroxide-curable fluoroelastomers with improved processibility comprising a polymeric chain having tetrafluoroethylene as one comonomer copolymerized with monomer units selected from the group (a) propylene, (b) propylene and vinylidene fluoride and (c) a $C_{2-3}$ hydrocarbon olefin and one or more perfluoro(alkyl vinyl ethers); said polymer chains having terminal iodo-groups.

8 Claims, No Drawings

BASE RESISTANT FLUOROELASTOMERS WITH IMPROVED PROCESSIBILITY AND CURABILITY

FIELD OF THE INVENTION

The subject invention relates to fluoroelastomers based on tetrafluoroethylene copolymers that are resistant to attack by base.

BACKGROUND OF THE INVENTION

Fluoroelastomer copolymers based on vinylidene fluoride, for example copolymers with hexafluoropropylene and, optionally, tetrafluoroethylene, are well-known, commercially available materials which possess unusually high chemical, thermal, and oxidative stability. They are readily cured by the use of diamines or by polyhydroxy compounds in combination with phase transfer agents such as quaternary ammonium or phosphonium salts and metal hydroxides. These crosslinking processes are possible because of the inherent susceptibility of vinylidene fluoride-containing polymers to attack by base. However, this sensitivity to base attack necessarily limits the utility of such fluoroelastomers to applications not requiring high resistance to base. Likewise, peroxide-curable fluoroelastomers based on vinylidene fluoride that also contain a peroxide-reactive curesite monomer, such as are described by Apotheker and Krusic in U.S. Pat. No. 4,035,565, are similarly reactive to basic materials. In practice there are many applications, for example in o-rings and shaft seals of internal combustion engines using aggressive oils and in oil well applications, in which resistance to base is required.

For these uses, special-purpose, base-resistant, peroxide-curable fluoroelastomers have been developed that do not contain vinylidene fluoride at all, (or if present, only in small amounts) and are based instead on tetrafluoroethylene. Such fluoroelastomers require either incorporation of special curesite monomers, or treatment prior to peroxide cure, to create radical-reactive sites. Thus copolymers of tetrafluoroethylene and propylene are known but require a curesite (U.S. Pat. No. 3,467,635) or heat treatment (U.S. Pat. No. 4,148,982) for creation of unsaturation to facilitate peroxide cure, and are often difficult to process. Random copolymers of tetrafluoroethylene, ethylene, perfluoroalkyl perfluorovinyl ethers and a curesite-monomer are described in U.S. Pat. No. 4,694,045. U.S. Pat. No. 3,859,259 and Japanese Examined Patent Kokoku 19325/1985 describe copolymers of tetrafluoroethylene and propylene that also contain vinylidene fluoride comonomer in low concentrations (5-30 mole percent), such that reactivity to base is not as severe as in the more highly fluorinated polymers described above. Prior heat treatment of the copolymer is required to promote peroxide curability (U.S. Pat. No. 4,148,982).

Tatemoto, et al., in U.S. Pat. No. 4,243,770 describe the preparation of fluoroelastomers containing vinylidene fluoride, that are prepared by emulsion copolymerization in the presence of chain transfer agents having the formula $RI_n$, where R is a perfluorocarbon or chloroperfluorocarbon residue having 1 to 8 carbon atoms, and n is 1 or 2. These polymers contain iodo groups at one or both ends of the polymer molecules, and are crosslinkable with peroxides and a crosslinking coagent.

The objects of this invention are to provide base-resistant fluoroelastomer copolymers of tetrafluoroethylene that have improved processibility and are readily crosslinked by peroxide without the use of expensive curesite monomers or pretreatment steps, and to provide an improved process for preparing said polymers.

SUMMARY OF THE INVENTION

A base-resistant, peroxide-curable fluoroelastomer with improved processibility comprising a polymeric chain having tetrafluoroethylene (TFE) as one comonomer copolymerized with monomer units selected from the group (a) propylene, wherein the concentration of tetrafluoroethylene is 45-70 mole %, (b) propylene and vinylidene fluoride ($VF_2$) wherein the mole ratios $TFE/propylene/VF_2$ are 5-65/5-40/5-40 and (c) a $C_{2-3}$ hydrocarbon olefin and one or more vinyl ethers having the formula $CF_2=CFO(CF_2)nCF_3$, where n is 0-5, wherein the mole ratios TFE/olefin/ether are 32-60/10-40/20-40; said polymer chains having terminal iodo-groups liberated during radical-catalyzed emulsion polymerization from a compound of the formula $RI_2$, wherein R is a saturated perfluorocarbon or chloroperfluorocarbon alkylene group of 3 or more carbon atoms, with at least 3 carbon atoms separating the iodo groups; said polymerization being carried out under semibatch polymerization conditions at monomer pressures above about 1.7 MPa preferably above about 2.0 MPa, and at temperatures of about 25°-100° C., preferably about 70°-90° C.

DETAILED DESCRIPTION OF THE INVENTION

The base resistant, peroxide-curable fluoroelastomers of this invention are tetrafluoroethylene copolymers comprised of molecular chains that have iodine atoms bonded to the terminal carbon atoms of the polymer chains. These structures are obtained by conducting a radical-catalyzed emulsion polymerization, under conditions to be described, in the presence of an iodine containing molecule, $RI_2$, wherein R is a saturated perfluorocarbon or chloroperfluorocarbon alkylene group of three or more carbon atoms with at least three carbon atoms between said iodo groups. Under radical polymerization conditions the iodo-compounds act as a chain transfer agent, resulting in a telomerization polymerization process in which a labile, iodine-containing chain end is formed, and the alkyl residue of the iodo-compound is attached to the other end of the polymer chain. When the iodo compound has two iodo groups, as herein defined, the fluoroelastomer chains will have iodo groups at each terminal position.

The iodo compound that will be employed is completely incorporated into the polymer molecules that are produced. The resulting iodo-terminated polymer molecules are "living polymers" in which polymer growth moves from chain to chain as iodine is transferred back and forth. The polymers made by this process typically have a narrow molecular weight distribution, with Mw/Mn less than 2, which contributes to desirable processing characteristics, especially in extrusion and injection molding.

The concentration of iodine in the polymer will fall in the range 0.1-1.0 weight %, preferably 0.1-0.5 weight %, and will depend upon the molecular weight of the copolymer product of the polymerization. The lower limit of iodine content corresponds to approximately the upper practical limit of polymer viscosity suitable for easy processing, as well as to the lowest state of cure where acceptable polymer properties are obtained. The upper limit on iodine content corresponds approximately to the practical lower limit on polymer viscosity where the polymer can be successfully handled in typical elastomer processing equipment. The upper limit on iodine content also corresponds to the highest state of cure giving satisfactory vulcanizate properties.

The iodine-containing compound may be exemplified by 1,3-diiodoperfluoro-n-propane, 1,4-diiodoperfluoro-n-butane, 1,3-diiodo-2-chloroperfluoro-n-propane, 1,5-diiodo-2,4-dichloroperfluoro-n-pentane 1,6-diiodoperfluoro-n-hexane, 1,8-diiodoperfluoro-n-octane, 1,12-diiodoperfluorododecane, 1,16-diiodoperfluorohexadecane, 1,3-di(iododifluoromethyl)perfluorocyclobutane, and others that will be known to those skilled in the art. A preferred iodine-containing compound is 1,4-diiodo-n-perfluorobutane.

The novel base-resistant fluoroelastomers of this invention are copolymers of tetrafluoroethylene and certain copolymerizable comonomers. In one useful embodiment, (a), the fluoroelastomer is a copolymer of tetrafluoroethylene and propylene having 45-70 mole %, preferably 45-60 mole % tetrafluoroethylene units.

In another embodiment, (b), the fluoroelastomer contains copolymerized units of tetrafluoroethylene, propylene and vinylidene fluoride, present in relative ratios of 5-65/5-40/5-40 mole %, preferably 30-60/20-35/10-35 mole %, respectively.

In yet another useful embodiment, (c) the fluoroelastomer will contain 32-60 mole % TFE, 10-40 mole %, preferably 10-30 mole % ethylene or propylene units, and 20-40 mole %, preferably 25-40 mole % perfluoro(alkyl vinyl ether) units of the formula $CF_2=CFO(CF_2)nCF_3$, where n is 0-5. A preferred perfluoro(alkyl vinyl ether) is perfluoro(methyl vinyl ether), hereafter sometimes referred to as PMVE, because it is more readily polymerizable to allow preparation of high molecular weight fluoroelastomers. Other representative perfluoro(alkyl vinyl ethers) are disclosed in U.S. Pat. No. 4,694,045, and are incorporated herein by reference. To obtain fluoroelastomers with lower glass transition temperatures, up to about 5 mole % of perfluoro(alkoxyalkyl vinyl ether) units can be substituted for the perfluoro(alkyl vinyl ether) units and, therefore the term "perfluoro(alkyl vinyl ether)" as used herein is intended to include those monomers that also contain minor amounts of up to about 5 mole % perfluoro(alkoxyalkyl vinyl ethers). Representative perfluoro(alkoxyalkyl vinyl ethers) wherein the alkoxy and alkyl groups each contain 1-5 carbon atoms are disclosed in U.S. Pat. No. 4,694,045 and are included herein by reference.

The polymers of this invention are prepared using a semi-batch, emulsion polymerization process in which the mole ratio of iodide chain transfer agent to initiator is in the range of about 2/1 to 20/1, preferably about 5/1 to 20/1. Higher ratios are not necessary and are impractical because the rate of polymerization is too low for commercial importance. Lower ratios give polymers with too few iodine end groups for good vulcanizate properties. Also, a low ratio of iodide to initiator gives polymers with broad molecular weight distribution leading to poor processing characteristics. The amount of iodide reagent added to the polymerization will depend on the molecular weight desired as well as the amount of polymer produced. For polymers of this invention, the iodine concentration in the polymer can vary from about 0.1-1.0 wt, but preferably in the range of about 0.1-0.5 wt. The amount of polymer in the aqueous dispersion can vary but should be in the range of about 5-30% solids (preferably 15-25%). Below this level, the polymer is difficult to recover from the dispersion. Above this preferred range, agglomeration in the autoclave can occur leading to inhomogeneous polymer products. Therefore, the amount of iodide reagent charged to the autoclave will be determined by these two considerations.

Initiators for the chain transfer polymerizations of this invention are the same as used in conventional fluoroelastomer polymerizations. These include organic and inorganic peroxides as well as azo compounds. Typical initiators include persulfates, peroxycarbonates, peroxyesters and the like. The preferred initiator is ammonium persulfate (APS). APS can either be used by itself or in combination with reducing agents such as sulfites and the like. The amount of initiator added to the polymerization is set by the amount of iodide reagent charged in order to maintain the desired iodide/initiator ratio.

In the case of emulsifiers for this process, salts of long chain fluorocarbon acids are preferred. A typical fluorocarbon dispersing agent used in this process is ammonium perfluorooctanoate (FC-143, 3M Co.). The amount of dispersing agent needed depends upon the surface active effect of the particular agent being used. When FC-143 is used, the preferred amount is in the range of 0.2% of the aqueous charge.

The temperature of the polymerization can vary from about 25° to 100° C. depending upon the nature of the initiator used and the particular polymers being prepared. However, with APS initiator, a temperature of 70° to 90° C. is preferred and 80° C. is most preferred. Higher temperatures can be used, in some cases, but undesirable side reactions such as branching and monomer rearrangements (e.g. rearrangement of perfluoroalkyl perfluorovinyl ether to acid fluoride) can occur.

The polymerization pressure will depend upon the vapor pressure of the monomers needed to sustain a polymerization rate of about 3 to 30 g/liter-hour (preferably between about 5 to 15 g/liter-hour). Below the desired rate, polymers with the desired molecular weight either cannot be prepared at all or the time required is too long to be practical. At higher than the specified rate of polymerization, undesired coupling reactions can occur which lead to broad molecular weight distributions and poor processing properties. Preparation of polymers of this invention at the preferred temperatures of 70°-90° C. requires pressures at or in excess of about 2.0 MPa (300 psi) before the desired rates of polymerization are obtained. Pressures in the range of 2.6 to 2.7 MPa (380-400 psi) are preferred. At the lower polymerization temperatures, operable monomer vapor pressures are correspondingly reduced to above about 1.7 MPa. In contrast, it has been found that, for the polymers of this invention, little or no polymerization occurs at a monomer pressure of 200 psi (1.4 MPa) at 80° C., if the temperature and iodide/initiator ratio are in the ranges specified above, while vinylidene fluoride polymers not containing hydrocarbon monomers, for example, can readily be prepared at 200 psi and even lower pressures.

A fluorocarbon solvent can be added to the emulsion polymerization mixture which can somewhat lower the pressure required to carry out the polymerization reaction. For example, 1,1,2-trichloro-1,2,2-trifluoroethane (F-113) added to the polymerization mixture at about 10-20% (wt) of the aqueous charge can result in a reduction of the vapor pressure of the mixture of about 0.6 to 0.7 MPa at 80° C. The presence of the F-113 does not change the nature of the polymer produced or stability of the emulsion obtained. Other fluorocarbon solvents can also be used for this same function as long as they have no chain transfer activity and have a high solubility for the monomers being used.

Fluoroelastomers made by the method described herein are generally crosslinked by a free radical process. A curable composition comprises polymer and a peroxide to generate free radicals at curing temperatures. A dialkyl peroxide which decomposes at a temperature above 50° C. is especially preferred when the composition is to be processed at elevated temperatures before it is cured. In many cases one will prefer to use a di-tertiarybutyl peroxide having a tertiary carbon atom attached to a peroxy oxygen. Among the most useful peroxides of this type are 2,5-dimethyl-2,5-di(tertiarybutylperoxy) hexyne-3 and 2,5-dimethyl-2,5-di(tertiarybutylperoxy) hexane. Other peroxides can be selected from such compounds as dicumyl peroxide, dibenzoyl peroxide, tertiarybutyl perbenzoate, di[1,3-dimethyl-3-(t-butylperoxy)butyl]carbonate, and the like.

Another material which is essential for the crosslinking reaction is a coagent composed of a polyunsaturated compound which is capable of cooperating with the said peroxide to provide a useful cure. These crosslinking coagents can be added in an amount equal to 0.5-10%, preferably about 1-7%, by weight of the copolymer content, and may be one or more of the following compounds: triallyl cyanurate; triallyl isocyanurate; tris(diallylamine-s-triazine); triallyl phosphite; N,N-diallyl acrylamide; hexaallyl phosphoramide; N,N,N',N'-tetraallyl tetraphthalamide; N,N,N',N'-tetraallyl malonamide; trivinyl isocyanurate; 2,4,6-trivinyl methyltrisiloxane; tri(5-norbornene-2-methylene) cyanurate; and the like. Particularly useful is triallyl isocyanurate.

Optionally, although it is not necessary, a metal compound selected from divalent metal oxides or divalent metal hydroxides may be added to the fluoroelastomer during preparation or before it is cured. These metal compounds include oxides of magnesium, calcium and lead, and calcium hydroxide.

The fluoroelastomers can also contain conventional fillers such as carbon black, clay, silica and talc; other fillers, pigments, antioxidants, stabilizers and the like can also be used. It is particularly advantageous to add carbon black to the fluoroelastomer to increase its modulus. Usually amounts of from 5-50 parts per hundred parts of fluoroelastomer are used, with the particular amount determined from the particle size of the carbon black and the desired hardness of the cured composition.

The peroxide-curable fluoroelastomer compositions of this invention are easily processible by conventional milling procedures, as well as with internal mixers. They may also be processed by extrusion and by injection molding techniques. They have excellent resistance to organic and inorganic bases, and are useful in the preparation of o-rings, shaft seals and other molded articles. The following examples illustrate preferred embodiments of the invention.

EXAMPLES

EXAMPLE 1

A 4000 ml stainless autoclave was evacuated and purged with nitrogen and then was charged with 2800 ml of deionized, deoxygenated water in which was dissolved 5.6 g. of ammonium perfluorooctanoate surfactant (FC-143, 3M Co.). The reactor was then pressured to about 0.2 MPa (30 psi) with the "start-up monomer" mixture which had the following composition: 37 mole % TFE and 63 mole % PMVE. The autoclave was vented off to about 0.03 Mpa (5 psi). The pressuring and venting was repeated 2 more times. Then the autoclave was heated to 80° C. while stirring at 600 RPM. The autoclave was then pressured to 2.66 MPa (386 psi) with the "start-up monomer" mixture described above. To start the polymerization, the autoclave was charged with 10 ml of a 1% solution of APS in H2O. After about 20 min., the pressure in the autoclave had decreased to about 2.63 MPa (382 psi). At this time, 3.6 g of 1,4-diiodoperfluorobutane, dissolved in 36 ml of 1,1,2-trichloro 1,2,2-trifluoroethane, was added. The autoclave was maintained at a pressure of about 2.62 MPa (380 psi), during the course of the polymerization, by regular addition of the "make-up monomer" mixture. The "make-up monomer" mixture had the following composition: 45 mole % TFE, 28 mole % ethylene and 27 mole % PMVE. After 2 hours reaction time, an additional 10 ml of 1% APS solution was added. The polymerization was allowed to continue for a total of 15 hours during which time 667 g of the "make-up monomer" mixture was added.

The unreacted monomers were vented from the autoclave and the polymer dispersion was discharged into a large polyethylene bottle. The pH of the dispersion was 3.2 and it contained 20.1% solids. The fluoroelastomer was isolated from the dispersion by coagulating with potassium aluminum sulfate solution. The coagulated polymer was allowed to settle and then was separated from the supernate by filtration. The polymer was then washed 3 times by high speed stirring in a large blender and filtering the washed polymer. Finally, the wet crumb was dried in a vacuum oven at 70° C. for at least 40 hours. The recovered, dry polymer weighed 645 grams.

The composition of the fluoroelastomer was as follows: 43.7 mole % TFE, 23.9 mole % ethylene and 32.4 mole % PMVE. The polymer contained 0.25% iodine. The Mooney viscosity, ML-10, measured at 121° C., was 19.0. The glass transition temperature was −20° C., as determined by differential scanning calorimetry (DSC).

The curing characteristics of the polymer were determined as follows: The fluoroelastomer composition was blended with 3 phr (parts per hundred of rubber) Luperco 101-XL (45% of 1,5-di(t-butylperoxy)hexane and 55% inert filler, 4 phr triallyl isocyanurate, and 25 phr MT (N990) carbon black on a two roll rubber mill. The blend was "sheeted out" from the mill to a thickness of approximately 1.8 mm. Rectangular pieces of this sheet stock, approximately 75 by 150 mm, were molded under pressure in a press at 160° C. for 10 minutes. Then the press cured sheets were annealed in a 180° C. oven for 2 hours prior to testing. Pellets for compression set determinations were prepared in a similar fashion. Stress strain properties were determined according to ASTM D-412. Cure characteristics were determined with an oscillating disk rheometer (ODR) at a cure time of 30 minutes and a temperature of 160° C., according to ASTM D-2084. The results are given in the Table I.

Comparative Example A

Example 1 was repeated except that the reactor was only pressured to 1.38 MPa (200 psi) with the "start-up monomer" mixture. Then, 10 ml of 1% APS initiator solution was added. The diiodide solution was added and the reaction was allowed to proceed for a total of 13.5 hours during which time an additional 60 ml of 1% APS solution was added in 10 ml increments. At the end of this time, only 42 g of "make-up monomer" mixture had reacted. The unreacted monomers were vented off and the product examined. The aqueous product contained 3.4% solids and had a pH of 2.4. Upon coagulation, washing and drying the coagulated product, 63 g of sticky, low molecular weight polymer was obtained. Analysis of this product indicated that it contained 2.45% iodine.

EXAMPLE 2

Example 1 was repeated except that after the reaction mixture was heated to 80° C., 350 ml of 1,1,2-trichloro 1,2,2-trifluoroethane was pumped into the autoclave. The autoclave was then pressured to 2.07 MPa (300 psi) with the "start-up monomer" mixture used in Example 1. 10 ml of 1% APS solution was then charged and the polymerization started. The diiodide solution was then charged and the "make-up monomer" mixture added semi-continuous]y to maintain the pressure at about 2.07 MPa. During the reaction period of 16.8 hours, a total of 667 g of the "make-up monomer" mixture was added. During the same period, two additional 10 ml portions of the 1% APS solution were also added. After venting off the unreacted monomers, the aqueous dispersion was found to contain 20.3% solids and had a pH of 2.6. The dispersion was coagulated and the separated polymer washed and dried as in Example 1. The dried polymer weighed 645 g and had the composition as follows: 48.6 mole % TFE, 21.9 mole % ethylene and 29.5 mole % PMVE. The iodine content was found to be 0.28%. The Mooney viscosity, ML-10, measured at 121° C., was 24.0.

This experiment was repeated 5 more times, and the products of the 6 runs were blended together. The combined product had the composition 47.9 mole % TFE, 22.2 mole % ethylene and 29.9 mole % PMVE. The Mooney viscosity, ML-10 measured at 121° C. was 25.

The blend was compounded with curatives and the physical properties evaluated as described in Example 1. Data are given in Table 1.

The processing characteristics of the blend were evaluated as follows: A 100 ton Rutil 6020 reciprocating screw injection molding machine with a simulated shaft seal mold was regulated so that the Barrel temperature was 60° C., the mold temperature was 183° C., and the cure time was 30 seconds. The polymer processed very easily. Mold release and adhesion to the metal inserts were excellent and there was no evidence of mold fouling.

EXAMPLE 3

The conditions in example 1 were repeated except the "start-up monomer" mixture had the following composition: 79 mole % TFE and 21 mole % propylene. The "make-up monomer" mixture had the composition 55 mole % TFE and 45 mole % propylene. After the autoclave was pressured to 2.62 MPa (380 psi) with the "start-up monomer" mixture, 20 ml of 1% APS solution was added. The diiodide solution was added after the pressure decreased to 2.59 MPa. The pressure was maintained at 2.62 MPa by addition of the "make-up monomer" mixture. The run was allowed to proceed for 20.5 hours during which time a total of 355 g of "make-up monomer" mixture was added. An additional 50 ml of 1% APS solution was also added in 10 ml increments. The polymer dispersion contained 12% solids and had a pH of 2.8. Coagulation, washing and drying of product were done as described in example 1. A total of 350 g of TFE/propylene copolymer rubber, with the composition 55 mole % TFE and 45 mole % propylene, was recovered. The iodine content was 0.49% and the Mooney viscosity, ML-10, measured at 121° C., was 16.0. The glass transition temperature was $-5°$ C.

The physical properties of the compounded and cured copolymer were determined as described in Example 1, and data are given in Table 1.

EXAMPLE 4

The conditions in Example 1 were repeated except that the "make-up monomer" mixture had the following composition: 44 mole % TFE, 29 mole % propylene, and 27 mole % PMVE. The polymerization was started by adding 10 ml of 1% APS solution. The diiodide solution was added and the "make-up monomer" mixture was charged to maintain the pressure at 2.62 Mpa (380 psi). The run was allowed to proceed for a total of 9.0 hours during which time a total of 293 g of "make-up monomer" mixture was reacted. During the reaction, 3 more 10 ml portions of 1% APS solution were added at approximately 3 hour intervals. The resulting polymer dispersion contained 7.4% solids and had pH of 3.3. The coagulated polymer was filtered, washed and dried as described in Example 1. 190 g of fluoroelastomer was obtained which had the approximate composition 44 mole % TFE, 29 mole % propylene and 27 mole % PMVE. The iodine content was 0.61%. The Mooney viscosity, ML-10, measured at 121° C., was 2.0. The glass transition temperature was $-6°$ C.

EXAMPLE 5

The conditions in Example 1 were repeated except that the "start-up monomer" and the "make-up monomer" mixtures had the following compositions, respectively: 48 mole % TFE, 18 mole % propylene, 34 mole % $VF_2$ and 50 mole % TFE, 30 mole % propylene, 20 mole % $VF_2$. The polymerization was started by adding 30 ml of 1% APS solution. The polymerization was carried out for 30 hours during which time 415 g of "make-up monomer" mixture was added to maintain the pressure at 2.76 MPa. Additional 10 ml portions of the 1% ApS solution were added every 3 hours during the polymerization run. The polymer dispersion contained 12.3% solids and had a pH of 2.5. A 500 ml portion of the dispersion was coagulated, washed and dried as described in Example 1. The resulting dry polymer weighed 62% and contained 0.49% iodine. The Mooney viscosity, ML-10, measured at 121° C., was 4.0. The glass transition temperature was $-5°$ C.

TABLE 1

| Example | 1 | 2 | 3 |
|---|---|---|---|
| Mooney Scorch (121° C.) | | | |
| Visc. | 8.0 | 11.0 | 18.2 |
| time to 10 unit rise, min. | >30 | >30 | >30 |
| ODR, 160° C. | | | |
| $M_L$, joules | 0.24 | — | 0.57 |
| $M_H$, joules | 5.2 | — | 4.5 |
| $t_s0.2$, min. | 2.5 | 2.0 | 2.2 |
| $t_c90$, min. | 9.6 | 8.5 | 11.0 |
| Tensile properties | | | |
| $M_{100}$, Mpa | 5.7 | 7.6 | 7.8 |
| $T_B$, Mpa | 14.0 | 17.2 | 14.4 |
| $E_B$, % | 190 | 193 | 230 |
| Compression Set, % (Pellets 200° C./70 hr.) | 36 | 36 | 57 |

I claim:

1. Base-resistant peroxide-curable fluoroelastomers with improved processability comprising a polymeric chain having tetrafluoroethylene as one comonomer copolymerized with hydrocarbon monomer units selected from the group (a) propylene, (b) propylene and vinylidene fluoride and (c) a $C_{2-3}$ hydrocarbon olefin and one or more perfluoro(alkyl vinyl ethers), said polymer chains having terminal iodo-groups.

2. The fluoroelastomer of claim 1 wherein the terminal iodo-groups are incorporated from a compound of the formula $RI_2$, wherein R is a saturated perfluorocarbon or chloroperfluorocarbon alkylene group of 3 or more carbon atoms, with at least 3 carbon atoms separating the iodo groups.

3. The fluoroelastomer of claim 1 or 2 wherein the fluoroelastomer comprises copolymerized units of tetrafluoroethylene and propylene in the mole ratios 45–70/55–30.

4. The fluoroelastomer of claim 1 or 2 wherein the fluoroelastomer comprises copolymerized units of tetrafluoroethylene and propylene in the mole ratios 45–60/55–40.

5. The fluoroelastomer of claim 1 or 2 wherein the fluoroelastomer comprises copolymerized units of tetrafluoroethylene, propylene and vinylidene fluoride in the mole ratios 5–65/5–40/5–40, respectively.

6. The fluoroelastomer of claim 1 or 2 wherein the fluoroelastomer comprises copolymerized units of tetrafluoroethylene, propylene and vinylidene fluoride in the mole ratios 30–60/20–35/10–35, respectively.

7. The fluoroelastomer of claim 1 or 2 wherein the fluoroelastomer comprises copolymerized units of tetrafluoroethylene, ethylene and one or more perfluoro(alkyl vinyl ethers) having the formula $CF_2=CFO(CF_2)_nCF_3$, where n is 0–5 or perfluoro(alkoxyalkyl vinyl ethers), present in mole ratios of 32–60/10–40/20–40, respectively.

8. The fluoroeslastomer of claim 7 wherein the perfluoro(alkyl vinyl ether) is perfluoro(methyl vinyl ether).

* * * * *